US011882064B2

(12) United States Patent
Tavildar et al.

(10) Patent No.: US 11,882,064 B2
(45) Date of Patent: *Jan. 23, 2024

(54) MULTIPLEXING DOWNLINK CONTROL INFORMATION OF SAME AGGREGATION LEVEL BY CODING TOGETHER

(71) Applicant: QUALCOMM Incorporated, San Diego, CA (US)

(72) Inventors: Saurabha Rangrao Tavildar, San Francisco, CA (US); Junyi Li, Franklin Park, NJ (US); Thomas Joseph Richardson, South Orange, NJ (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 17/331,349

(22) Filed: May 26, 2021

(65) Prior Publication Data
US 2021/0320765 A1 Oct. 14, 2021

Related U.S. Application Data

(63) Continuation of application No. 14/976,234, filed on Dec. 21, 2015.
(Continued)

(51) Int. Cl.
H04L 5/00 (2006.01)
H04L 45/24 (2022.01)
(Continued)

(52) U.S. Cl.
CPC ............ *H04L 5/0035* (2013.01); *H04L 5/001* (2013.01); *H04L 5/0053* (2013.01);
(Continued)

(58) Field of Classification Search
CPC . H04L 5/0035; H04L 27/0008; H04L 5/0053; H04L 45/245; H04L 5/023; H04W 72/0426; H04W 88/08
See application file for complete search history.

(56) References Cited

U.S. PATENT DOCUMENTS 7,920,469 B2    4/2011  Li et al.
8,385,281 B2    2/2013  Pan et al.
(Continued)

FOREIGN PATENT DOCUMENTS

CN    101820669 A    9/2010
CN    101926191 A    12/2010
(Continued)

OTHER PUBLICATIONS

Huawei, et al., "Discussion on Issues for PDCCH Coverage Improvement", 3GPP TSG RAN WG1 Meeting #76, R1-140028, Prague, Czech Republic, Feb. 10, 2014-Feb. 14, 2014, 5 Pages, Jan. 29, 2014.
(Continued)

Primary Examiner — Christine Ng
(74) Attorney, Agent, or Firm — Patterson + Sheridan, L.L.P.

(57) ABSTRACT

Certain aspects of the present disclosure relate to a technique for multiplexing downlink control information (DCI) signals for multiple user equipments (UEs) at an aggregation level (AL) by coding the DCI signals together in a control channel and transmitting the control channel. In an exemplary method, a BS multiplexes a first plurality of downlink control information (DCI) signals for a first plurality of user equipments (UEs) at a first aggregation level (AL) coded together in a first control channel and transmits the control channel.

29 Claims, 12 Drawing Sheets

Related U.S. Application Data

(60) Provisional application No. 62/199,832, filed on Jul. 31, 2015.

(51) Int. Cl.

| | | |
|---|---|---|
| *H04L 5/02* | (2006.01) | |
| *H04W 72/27* | (2023.01) | |
| *H04L 27/00* | (2006.01) | |
| *H04W 88/08* | (2009.01) | |
| *H04L 1/1829* | (2023.01) | |

(52) U.S. Cl.
CPC ............ *H04L 5/0096* (2013.01); *H04L 5/023* (2013.01); *H04L 27/0008* (2013.01); *H04L 45/245* (2013.01); *H04W 72/27* (2023.01); *H04L 1/1841* (2013.01); *H04W 88/08* (2013.01)

(56) References Cited

U.S. PATENT DOCUMENTS

| | | | |
|---|---|---|---|
| 8,626,218 B2 | 1/2014 | Wang | |
| 9,622,192 B2 | 4/2017 | Ji et al. | |
| 2008/0225788 A1 | 9/2008 | Inoue et al. | |
| 2009/0316641 A1* | 12/2009 | Yamada | H04W 56/0005 370/329 |
| 2010/0303011 A1* | 12/2010 | Pan | H04L 5/0007 370/328 |
| 2011/0255619 A1* | 10/2011 | Nam | H04L 1/0031 375/260 |
| 2012/0033627 A1 | 2/2012 | Li et al. | |
| 2012/0099509 A1* | 4/2012 | Ai | H04L 1/007 370/312 |
| 2012/0201216 A1 | 8/2012 | Wu | |
| 2013/0058291 A1* | 3/2013 | Ahn | H04L 5/0007 370/329 |
| 2013/0235817 A1* | 9/2013 | Wu | H04L 5/0094 370/329 |
| 2013/0286980 A1 | 10/2013 | Liao et al. | |
| 2013/0315114 A1 | 11/2013 | Seo et al. | |
| 2014/0086184 A1* | 3/2014 | Guan | H04W 72/1289 370/329 |
| 2014/0119349 A1* | 5/2014 | Takano | H04W 16/32 370/336 |
| 2014/0126487 A1* | 5/2014 | Chen | H04B 7/0697 370/329 |
| 2014/0177561 A1 | 6/2014 | Yu et al. | |
| 2014/0192759 A1 | 7/2014 | Son et al. | |
| 2014/0233407 A1 | 8/2014 | Pourahmadi et al. | |
| 2014/0286285 A1 | 9/2014 | Park et al. | |
| 2014/0321368 A1 | 10/2014 | Ivanov et al. | |
| 2015/0244510 A1* | 8/2015 | Chae | H04L 1/1893 370/329 |
| 2016/0212749 A1 | 7/2016 | Abraham et al. | |
| 2016/0227523 A1* | 8/2016 | Desai | H04W 72/042 |
| 2016/0249331 A1* | 8/2016 | Park | H04L 1/1819 |
| 2016/0254878 A1* | 9/2016 | Wang | H04L 5/0053 370/329 |
| 2017/0033901 A1 | 2/2017 | Tavildar et al. | |
| 2017/0070979 A1* | 3/2017 | Mirzaee | H04L 1/0035 |
| 2017/0126306 A1* | 5/2017 | Kim | H04W 76/14 |
| 2018/0295612 A1* | 10/2018 | Yi | H04L 5/0053 |

FOREIGN PATENT DOCUMENTS

| | | |
|---|---|---|
| CN | 102238621 A | 11/2011 |
| EP | 2765723 A1 | 8/2014 |
| JP | 2008236018 A | 10/2008 |
| JP | 2014239553 A | 12/2014 |
| KR | 20150041562 A | 4/2015 |
| TW | 201507497 A | 2/2015 |
| WO | 2009099844 A1 | 8/2009 |
| WO | 2010147435 A2 | 12/2010 |
| WO | 2013115394 A1 | 8/2013 |
| WO | 2015050339 A1 | 4/2015 |
| WO | 2015062051 A1 | 5/2015 |

OTHER PUBLICATIONS

International Search Report and Written Opinion—PCT/US2016/037235—ISA/EPO—dated Aug. 24, 2016.
LG Electronics: "Details on M-PDCCH Search Space Design", 3GPP Draft, 3GPP TSG-RAN WG1 #81, R1-152698 Details On M-PDCCH Search Space Design, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 25, 2015-May 29, 2015 May 16, 2015 (May 16, 2015), XP050973962, 8 Pages, Retrieved from the Internet: URL:http://www.3gpp.org/ftp/tsg_ran/WG1_RL1/TSGR1_81/Docs/ [retrieved on May 16, 2015] figures 2-3.
LG Electronics: "Downlink Control Channel Related Issues for MTC", 3GPP TSG RAN WG1 Meeting #80bis, R1-151487, Belgrade, Serbia, Apr. 20, 2015-Apr. 24, 2015, 8 Pages, Apr. 10, 2015.
Notification of Transmittal of The International Preliminary Report on Patentability, Issued in PCT/US2016/037235 dated Nov. 8, 2017.
Sony: "Issues with dynamically allocating the PDSCH narrowband region for MTC via Dci", 3GPP TSG-RAN WG1#81, R1-153082, 3GPP, May 16, 2015, pp. 1-10.
Taiwan Search Report—TW105118940—TIPO—dated Dec. 13, 2019.
Taiwan Search Report—TW105118940—TIPO—dated Jun. 22, 2020.

\* cited by examiner

| Field | Size | Comment |
|---|---|---|
| MCS/Size | 4-7 bits | Can depend on system BW and AL<br>With 100 CCEs (20 MHz):<br>8 AL -> max 12 multiplexed (4 bits)<br>4 AL -> 5 bits, 2 AL -> 6 bits, 1 AL-> 7 bits<br>Note 1: only total size needs to be signaled not the number of users<br>Note 2: joint signaling along with PCFICH can be considered – further optimization on PDCCH resources can considered. |
| DCI# | 4 bits | Total 16 possible DCI formats |
| C-RNTI | 4-16 bits | Scope for optimization since a cell may not have a large number of active UEs. |
| DCI | Variable | Need to be known (/specified) based on DCI# |
| Power | 4-6 bits | Needed for SIC |
| CRC | 16 bits | |

FIG. 12

MULTIPLEXING DOWNLINK CONTROL INFORMATION OF SAME AGGREGATION LEVEL BY CODING TOGETHER

CROSS-REFERENCE TO RELATED APPLICATIONS

The present application is a continuation of U.S. patent application Ser. No. 14/976,234 filed Dec. 21, 2015, which claims the benefit of U.S. Provisional Application No. 62/199,832, filed Jul. 31, 2015, which is assigned to the assignee of the present application and hereby expressly incorporated by reference herein in its entirety.

BACKGROUND

Field of the Disclosure

The present disclosure relates generally to communication systems, and more particularly, to a technique for multiplexing downlink control information (DCI) signals for multiple user equipments (UEs) at an aggregation level (AL) by coding the DCI signals together in a control channel and transmitting the control channel.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications performed by a base station (BS). The method generally includes multiplexing a first plurality of downlink control information (DCI) signals for a first plurality of user equipments (UEs) at a first aggregation level (AL) coded together in a first control channel and transmitting the first control channel.

Certain aspects of the present disclosure provide a method for wireless communications performed by a user equipment (UE). The method generally includes receiving a first control channel including a plurality of downlink control information (DCI) signals for a plurality of UEs at one aggregation level (AL) coded together and identifying a DCI signal within the first control channel directed to the UE.

Certain aspects of the present disclosure provide an apparatus for wireless communications by a base station (BS). The apparatus generally includes a processor configured to multiplex a first plurality of downlink control information (DCI) signals for a first plurality of user equipments (UEs) at a first aggregation level (AL) coded together in a first control channel and transmit the first control channel, and a memory coupled with the processor.

Certain aspects of the present disclosure provide an apparatus for wireless communications by a user equipment (UE). The apparatus generally includes a processor configured to receive a first control channel including a plurality of downlink control information (DCI) signals for a plurality of UEs at one aggregation level (AL) coded together and identify a DCI signal within the first control channel directed to the UE, and a memory coupled with the processor.

Certain aspects of the present disclosure provide an apparatus for wireless communications by a base station (BS). The apparatus generally includes means for multiplexing a first plurality of downlink control information (DCI) signals for a first plurality of user equipments (UEs) at a first aggregation level (AL) coded together in a first control channel and means for transmitting the first control channel.

Certain aspects of the present disclosure provide an apparatus for wireless communications by a user equipment (UE). The apparatus generally includes means for receiving a first control channel including a plurality of downlink control information (DCI) signals for a plurality of UEs at one aggregation level (AL) coded together and means for identifying a DCI signal within the first control channel directed to the UE.

Certain aspects of the present disclosure provide a computer readable medium storing computer readable code for wireless communications by a base station (BS). The code generally includes instructions for multiplexing a first plurality of downlink control information (DCI) signals for a first plurality of user equipments (UEs) at a first aggregation level (AL) coded together in a first control channel and instructions for transmitting the first control channel.

Certain aspects of the present disclosure provide a computer readable medium storing computer readable code for wireless communications by a user equipment (UE). The code generally includes instructions for receiving a first control channel including a plurality of downlink control information (DCI) signals for a plurality of UEs at one aggregation level (AL) coded together and instructions for identifying a DCI signal within the first control channel directed to the UE.

BRIEF DESCRIPTION OF THE DRAWINGS

FIG. 12 illustrates an exemplary set of fields that may be used when multiplexing DCIs in a control channel, in accordance with aspects of the present disclosure.

DETAILED DESCRIPTION

Figure 1:
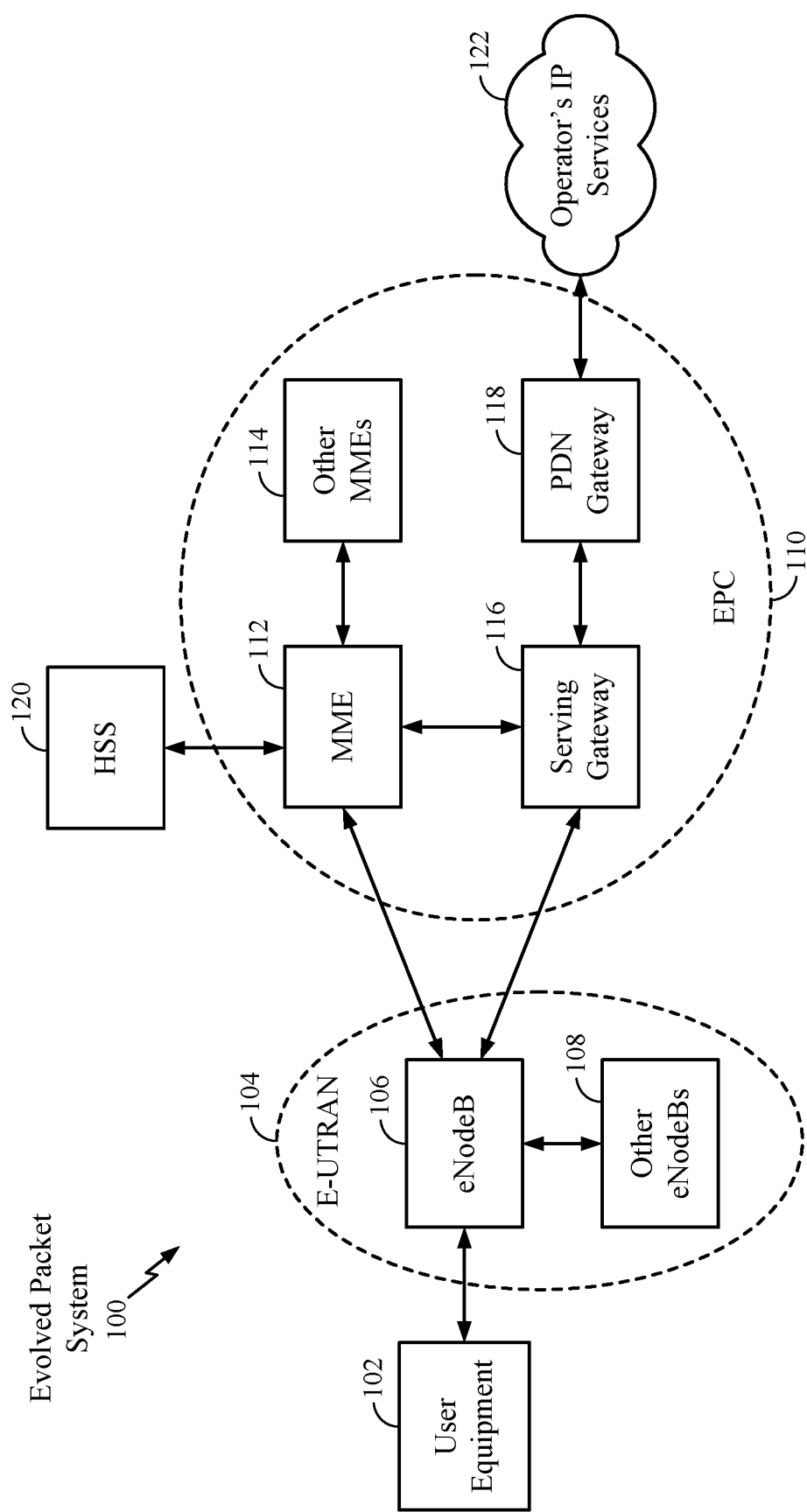
FIG. 1 is a diagram illustrating an example of a network architecture.

According to aspects of the present disclosure, a BS may multiplex a first plurality of DCI signals directed to a first plurality of UEs at a first aggregation level coded together in a control channel (e.g., a PDCCH). The BS may multiplex a second plurality of DCI signals directed to a second plurality of UEs in a second control channel. The BS may transmit the control channels on separate time and frequency resources, or transmit the control channels at different power levels on the same time and frequency resources. A UE may receive the control channels and identify DCI signals directed to the UE based on identifier fields included with the DCI signals in the control channels.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
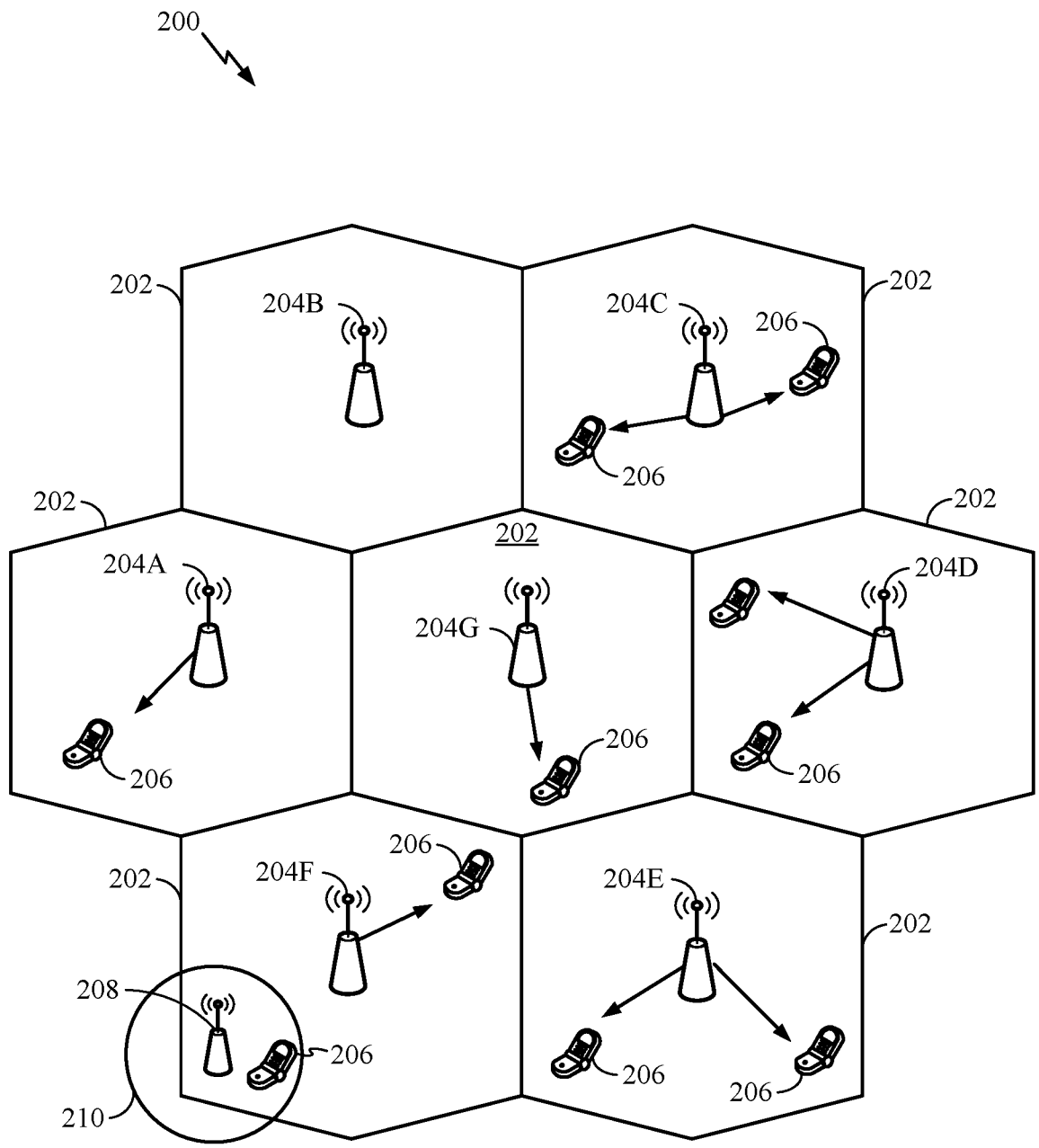
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
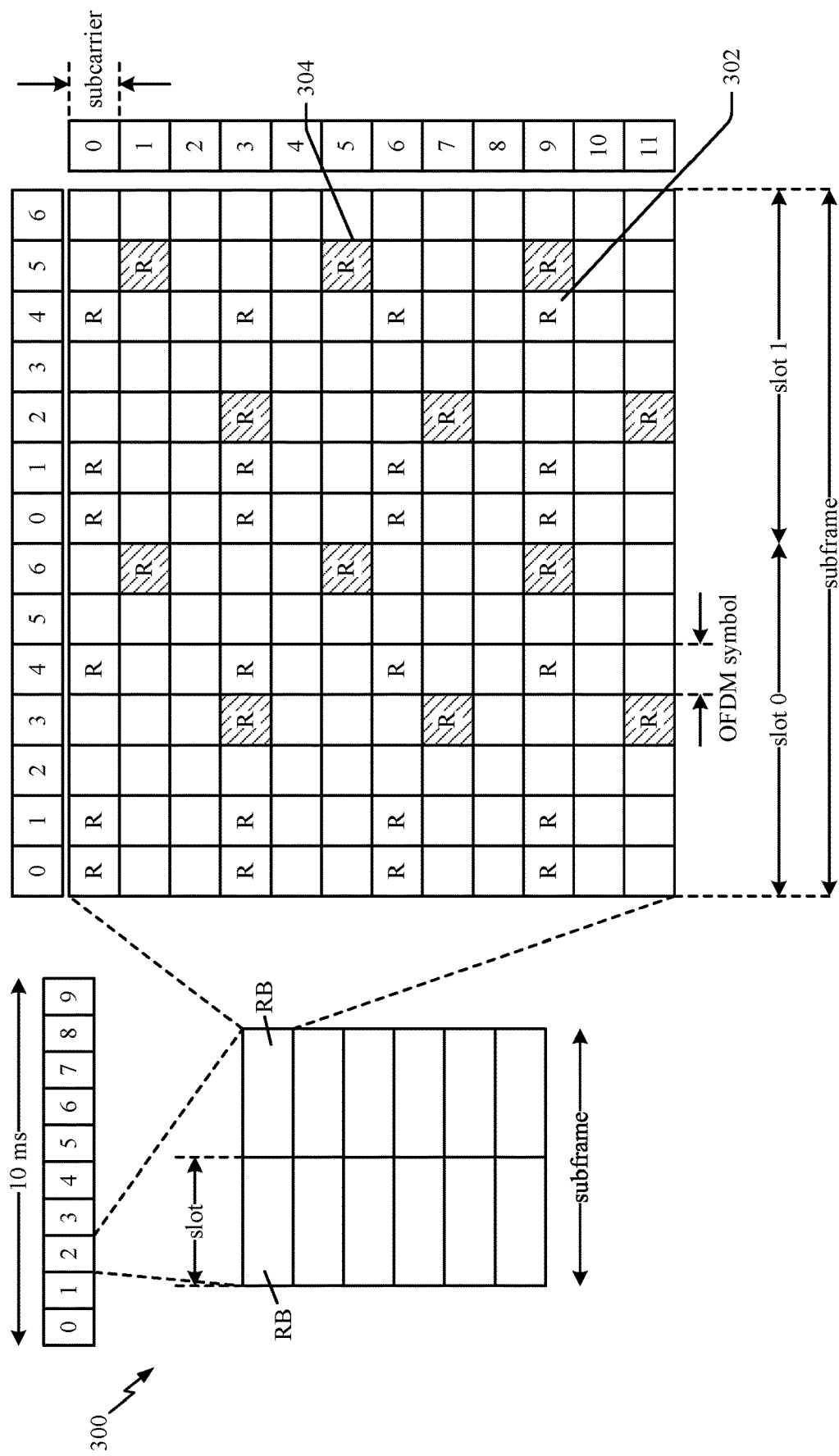
FIG. 3 is a diagram illustrating an example of a downlink (DL) frame structure in LTE.

FIG. 3 is a diagram 300 illustrating an example of a DL frame structure in LTE. A frame (10 ms) may be divided into 10 equally sized sub-frames. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
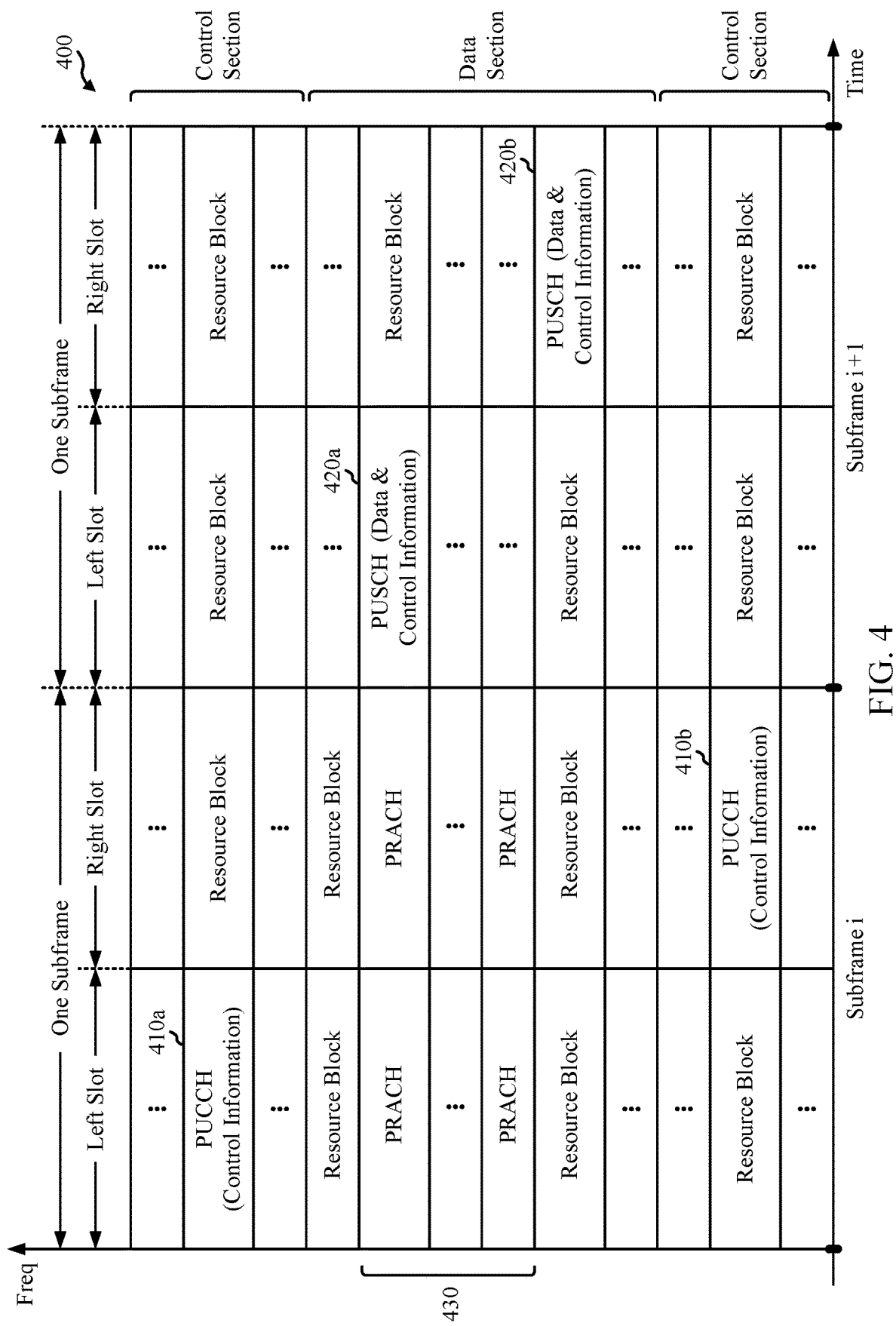
FIG. 4 is a diagram illustrating an example of an uplink (UL) frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size.

The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
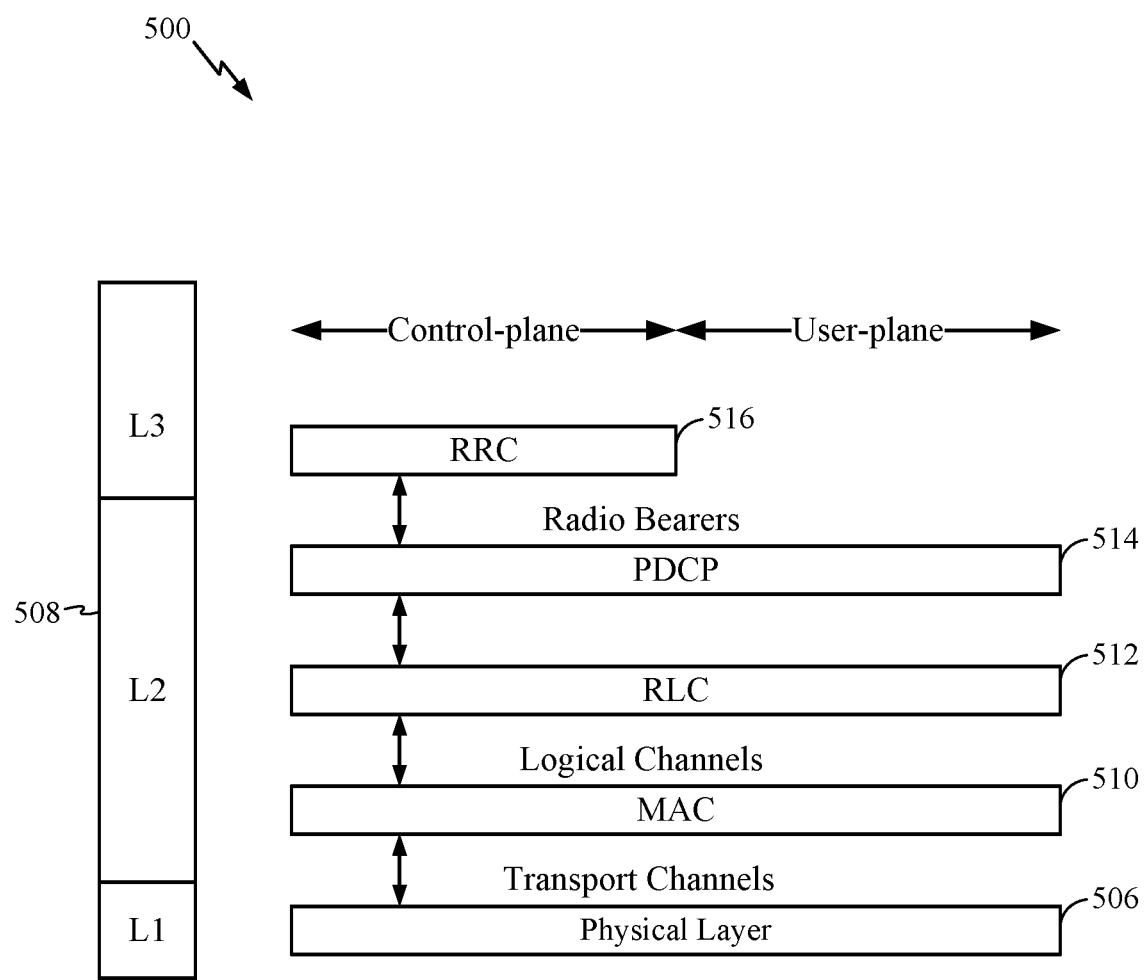
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
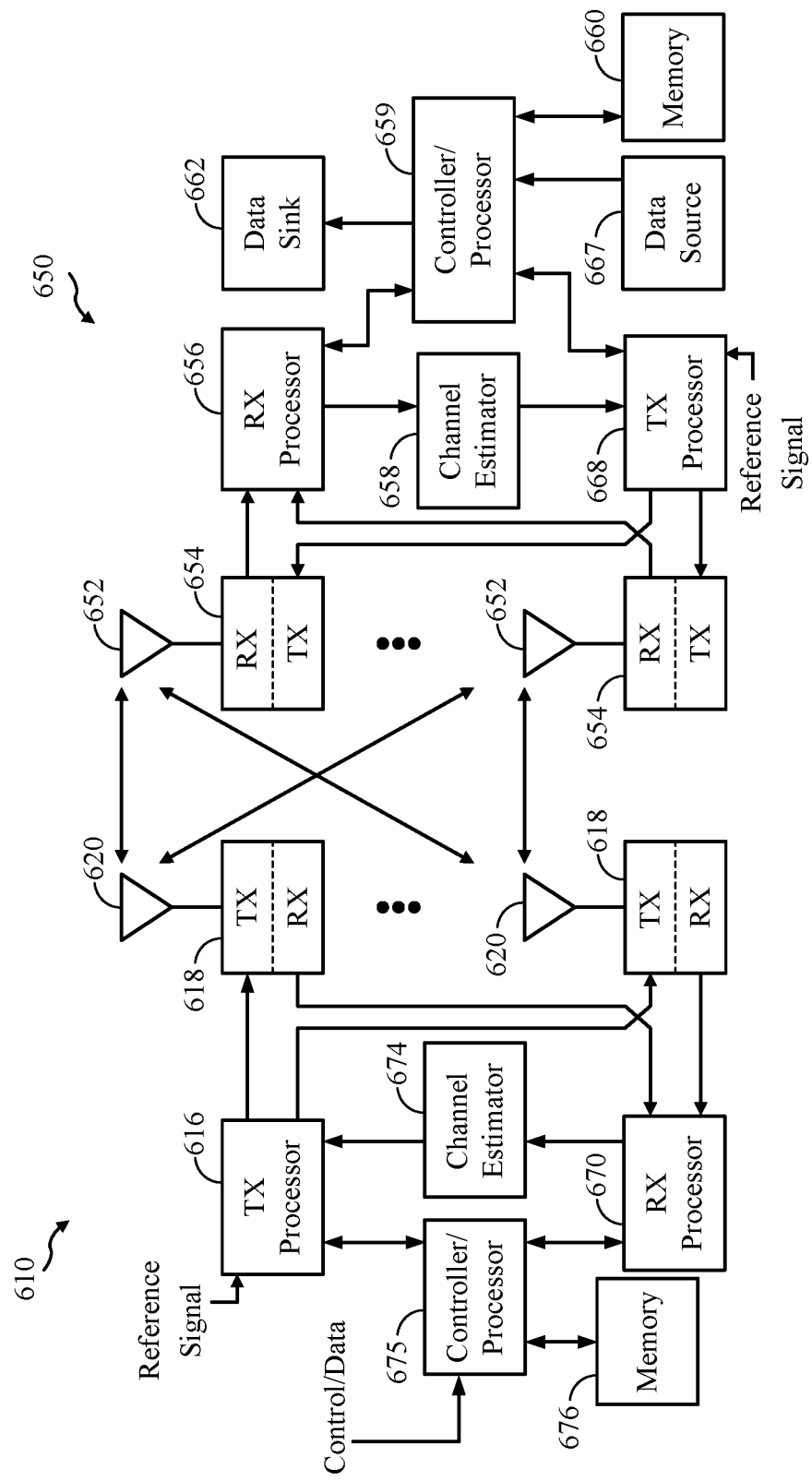
FIG. 6 is a diagram illustrating an example of an evolved Node B and user equipment (UE) in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650. The controller/processor may perform or direct the eNB in performing operations described in this disclosure, for example, operation 800 described in FIG. 8.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. The TX processor may also perform or direct the eNB in performing operations described in this disclosure, for example, operation 800 described in FIG. 8.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659. The RX processor may perform or direct the UE in performing operations described in this disclosure, for example, operation 900 described in FIG. 9.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. The controller/processor may perform or direct the UE in performing operations described in this disclosure, for example, operation 900 described in FIG. 9.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In current (e.g., LTE Release 12 (Rel-12)) wireless communications systems, a BS notifies UEs of scheduling grants for uplink and downlink transmissions by sending downlink control information (DCI) signals to the UEs. A DCI signal is included in a physical downlink control channel (PDCCH) that is transmitted to the UE scheduled in the DCI signal. A UE monitors search spaces in order to detect PDCCHs directed to the UE, and, as the number of CCEs for each of the PDCCHs may vary and is not signaled, attempts to blindly decode PDCCHs in the search spaces. To reduce the complexity of this process somewhat, certain restrictions on the aggregation of contiguous CCEs have been specified. For example, an aggregation of eight CCEs can only start on CCE numbers evenly divisible by 8. If the UE successfully decodes a PDCCH directed to the UE, then the UE acquires the DCI signal and is informed of the scheduling grant.

A UE may monitor both a common search space and a UE-specific search space in a control region of a subframe. A search space may comprise a set of channel control element (CCE) locations where a UE may find its PDCCHs. All UEs served by a cell monitor the common search space, while a UE-specific search space is configured for an individual UE.

One or more CCEs are used to transmit each PDCCH. Sets of four consecutive physical resource elements (REs) are known as resource element groups (REGs), and nine REGs make up each CCE. Thus, one CCE equals 36 REs. The number of CCEs used for (e.g., to transmit) a PDCCH may be 1, 2, 4, or 8, known as an aggregation level (AL) of the PDCCH. An aggregation level is selected for a PDCCH transmission, by the transmitting BS, based on signal to interference and noise ratios (SINRs) experienced by UEs to which the PDCCH is directed. In other examples, aggregation level can be determined by the eNodeB on channel conditions other than signal to interference and noise ratios. That is, an aggregation level for a PDCCH directed to a single UE may be selected by a BS based on an SINR the UE has reported to the BS for transmissions from the BS, while an aggregation level for a PDCCH directed to several UEs may be selected by the BS based on SINRs reported by the several UEs. For example, when a PDCCH is intended for a UE under good downlink channel conditions (e.g. the UE is close to the eNodeB), then one CCE is likely to be sufficient, and the eNB may select aggregation level one for the PDCCH. However, when a PDCCH is intended for a UE under poor channel conditions (e.g. near the cell border) then up to eight CCEs may be used to achieve sufficient robustness and the eNB may select aggregation level eight for the PDCCH.

Each search space (i.e., the common search space and the UE-specific search spaces) comprises a group of consecutive CCEs that could be allocated to a PDCCH, called a PDCCH candidate. For each aggregation level, each UE has to try to decode more than one possible candidate. The CCE aggregation level determines the number of PDCCH candidates in a search space. Table 1 (reproduced from 3GPP TS 36.213 "Evolved Universal Terrestrial Radio Access (E-UTRA); Physical layer procedures" v8.8.0, which is publicly available and hereby incorporated by reference) gives the number of candidates and size of the search space for each aggregation level.

TABLE 1

| TYPE | Aggregation Level | Size in CCEs | Number of PDCCH Candidates |
|---|---|---|---|
| UE-Specific | 1 | 6 | 6 |
| UE-Specific | 2 | 12 | 6 |
| UE-Specific | 4 | 8 | 2 |
| UE-Specific | 8 | 16 | 2 |
| Common | 4 | 16 | 4 |
| Common | 8 | 16 | 2 |

It can be observed in Table 1 that that there may be up to six PDCCH candidates in the common search space (i.e., four for control channel element (CCE) aggregation level 4, and two for aggregation level 8), and up to 16 candidates in the UE-specific search space (i.e., six for aggregation level 1, six for aggregation level 2, two for aggregation level 4, and two for aggregation level 8). The number of CCEs to be searched within each PDCCH candidate depends on the aggregation level. Thus, there are 4 PDCCH candidates in the common search space for aggregation level 4 and 2 PDCCH candidates for aggregation level 8, though both sets of PDCCH candidates are sixteen CCEs in size. A UE monitors for PDCCHs directed to the UE in a set of PDCCH candidates in every subframe.

Figure 7:
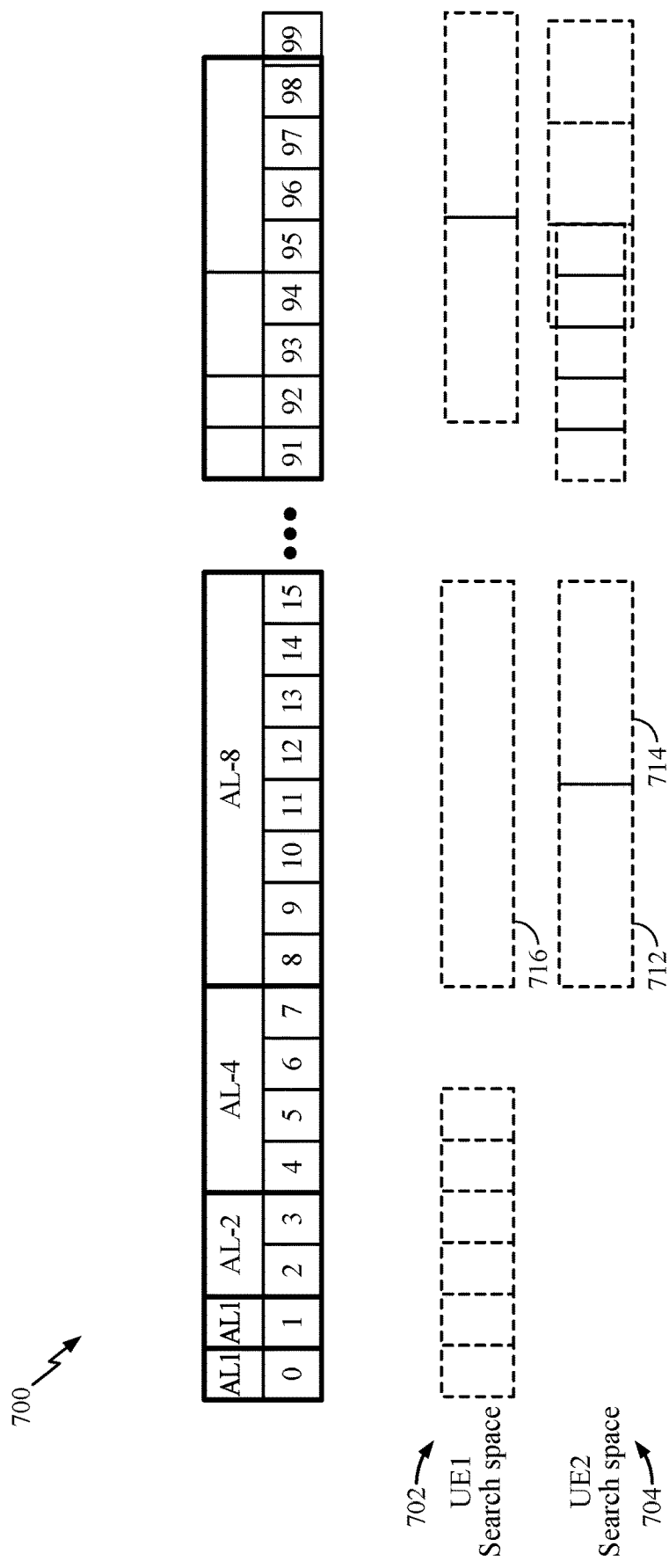
FIG. 7 illustrates an exemplary set of control channel elements (CCEs), in accordance with aspects of the present disclosure.

FIG. 7 illustrates an exemplary set 700 of CCEs. UE-specific search spaces are shown at 702 and 704. Note that, as illustrated, UE-specific search spaces for different UEs may overlap. PDCCH candidates at different aggregation levels for a UE may also overlap. In addition, the common search space and UE-specific search space for a UE may overlap.

An overlap, if such occurs, may limit the possibility of scheduling a UE due to potential collision with other UEs. For example and with reference to FIG. 7, if a BS schedules UE1 using the aggregation level 8 PDCCH at 716, then the BS cannot schedule UE2 using either of the aggregation level 4 PDCCHs at 712 and 714. If the other AL 4 and AL 8 PDCCH candidates for UE1 (recall from Table 1 above that there are two AL 8 PDCCH candidates in the UE-specific search space and 6 PDCCH candidates in the common search space) are also blocked and SINR conditions for UE1 require the use of AL 4 or AL 8 PDCCH transmissions to UE1, then the BS will not be able to schedule UE1 during that subframe.

A BS may attempt to schedule K (e.g., 10-20) users of N (e.g., 100) UEs being served in a cell during each subframe. The N users may experience varying SINR conditions when receiving from the BS. Because of the varying SINR conditions, PDCCHs to the scheduled UEs may be transmitted at varying aggregation levels. In some cases, a BS will be unable to transmit a PDCCH to a UE because all PDCCH candidates for the UE overlap with PDCCH candidates of other UEs to which the BS has scheduled PDCCH transmissions.

Each PDCCH transmitted by a BS includes a 16-bit cyclic redundancy check (CRC). However, the transmitting BS masks the CRC with a radio network temporary identifier (RNTI) of a UE or UEs to which the PDCCH is directed. A UE determines that a PDCCH is directed to the UE by attempting blind decoding of PDCCH candidates. Blind decoding includes unmasking a CRC of a PDCCH candidate with one or more RNTIs assigned to the UE, and then checking that a CRC calculated against other (non-CRC) portions of the PDCCH candidate matches the unmasked CRC. Approximately 0.1% of PDDCH transmissions are incorrectly decoded (e.g., due to interference) by a UE as being directed to a UE, commonly referred to as a "false alarm." False alarms may reduce overall system throughput, as UEs experiencing false alarms may transmit at incorrect times or frequencies, possibly interfering with other transmissions. A UE experiencing a false alarm may receive at incorrect times or frequencies, possibly interfering with the operation of the UE (e.g., by causing the UE to miss a transmission on another frequency at that time).

Current PDCCH design (i.e., as described above) causes addition of new DCI formats to increase the number of blind decodes by UEs, as a UE must determine if each PDCCH candidate can be decoded for each possible DCI length. In Rel-12 wireless communications systems, DCI formats 0, 1A, 3, 3A, and 5 have been designed to have the same length (in number of bits), to keep the number of blind decodes performed by UEs smaller. In some wireless communications systems, one or more UEs are configured to receive DCIs of only a limited number of formats, in order to reduce the number of blind decodes performed by those UEs.

Multiplexing Downlink Control Information of Same Aggregation Level by Coding Together According to aspects of the present disclosure, a BS may multiplex a plurality of DCI signals directed to a plurality of UEs at a first aggregation level (AL) coded together in a control channel (e.g., a PDCCH). A BS may determine aggregation level of a UE based on SINR conditions of the UE, for example, based on a channel quality indicator (CQI) report received from the UE. A BS operating according to disclosed techniques may avoid scheduling conflicts between UEs, in that DCIs for the UEs are multiplexed in the bit domain and not the symbol domain, allowing UEs to be scheduled in any CCE, rather than scheduling of a UE being limited to CCEs within search spaces configured for the UE. A BS may multiplex multiple DCIs for the UEs by concatenating the DCIs.

According to aspects of the present disclosure, new DCI formats may be easily defined, because four or more bits may be reserved in a DCI to indicate the format of the DCI. According to aspects of the present disclosure, DCIs (i.e., DCI signals) may be of variable length, as DCI signals multiplexed together in the bit domain are not required to all be of the same length.

According to aspects of the present disclosure, a BS may transmit multiple DCIs to a UE during a subframe. A BS may multiplex multiple DCIs to a UE in a control channel (e.g., a PDCCH) in a subframe by including an RNTI of the UE in each of the DCIs. For example, a BS may multiplex a first DCI for a first UE, a second DCI for a second UE, a third DCI for the first UE, a fourth DCI for a third UE, and a fifth DCI for the first UE in a single control channel. In the example, the BS may include a cell radio network temporary identifier (C-RNTI) of the first UE in the first, third, and fifth DCIs, while including a C-RNTI for the second UE in the second DCI and a C-RNTI for the third UE in the fourth DCI.

Figure 8:
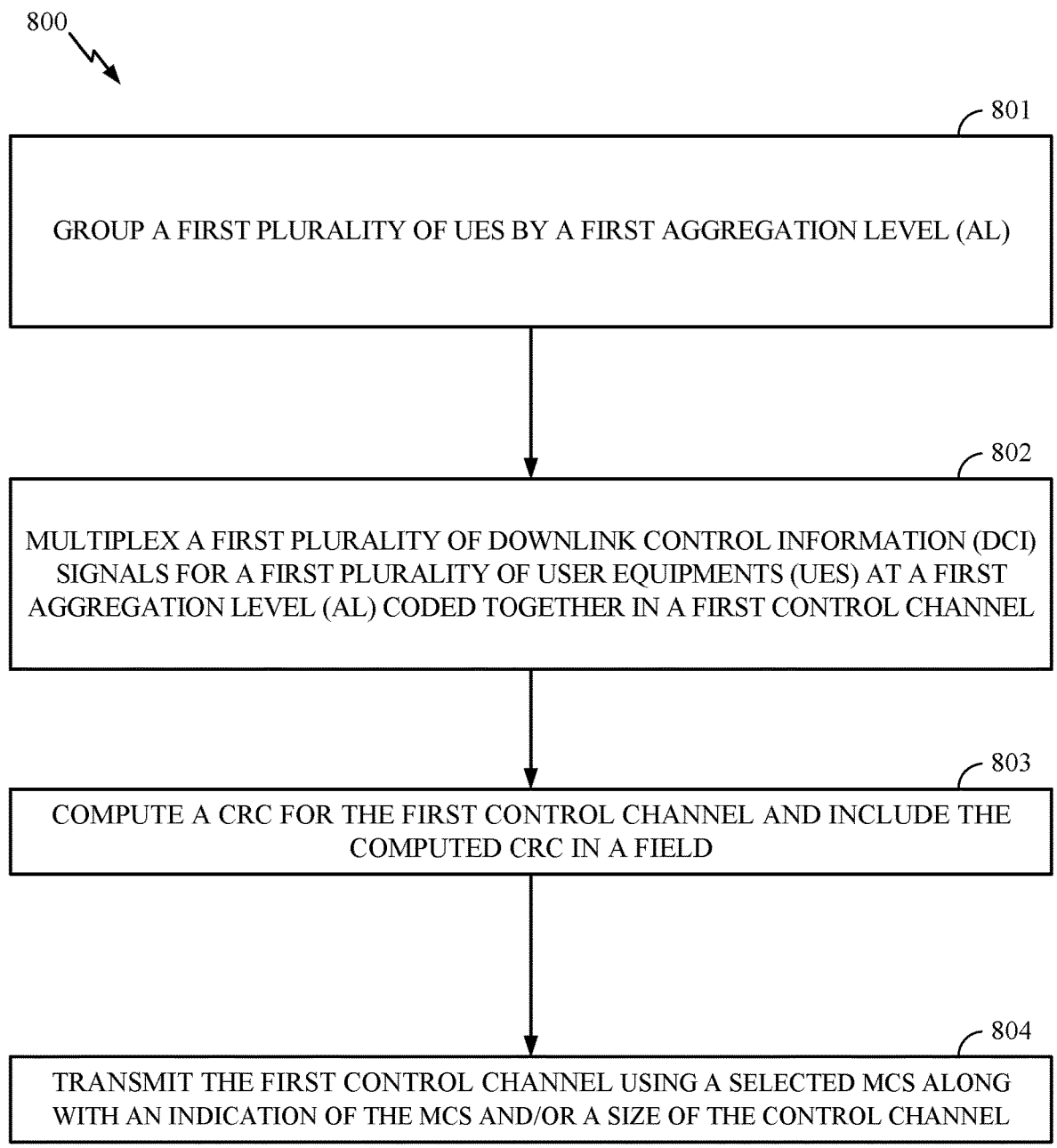
FIG. 8 illustrates an exemplary operation that may be performed by a BS, in accordance with aspects of the present disclosure.

FIG. 8 illustrates an exemplary operation 800 that may be performed by a BS to multiplex DCIs of one AL by coding the DCIs together in a control channel, in accordance with certain aspects of the disclosure. The BS may include the eNodeBs 106, 204 and/or 610, for example.

Operation 800 may begin, at 801 where the BS groups a first plurality of UEs by a first aggregation level (AL). Next, at 802, the BS multiplexes a first plurality of downlink control information (DCI) signals for a first plurality of user equipments (UEs) at a first aggregation level (AL) coded together in a first control channel. At 803, the BS computes a CRC for the first control channel and includes the computed CRC in a field. At 804, the BS transmits the first control channel using a selected MCS along with an indication of the MCS and/or a size of the control channel.

Figure 9:
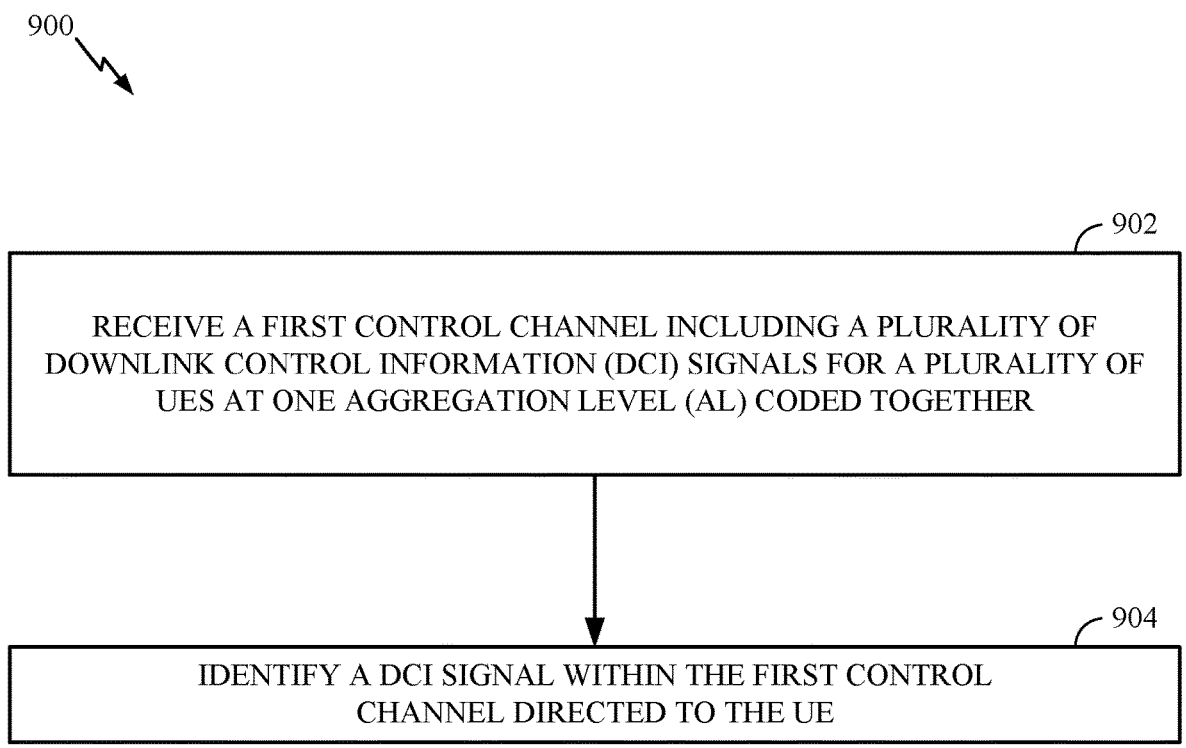
FIG. 9 illustrates an exemplary operation that may be performed by a UE, in accordance with aspects of the present disclosure.

FIG. 9 illustrates an exemplary operation 900 that may be performed by a UE to receive a control channel including DCIs of one AL multiplexed together in a control channel, in accordance with certain aspects of the disclosure. The UE 102 may include UEs 102, 206, and/or 650, for example.

Operation 900 may begin, at 902, by the UE receiving a first control channel including a plurality of downlink control information (DCI) signals for a plurality of UEs at one aggregation level (AL) coded together. At 904, the UE may identify a DCI signal within the first control channel directed to the UE.

According to aspects of the present disclosure, a BS (e.g., eNodeB 106) scheduling control channel transmissions to UEs may group the UEs by aggregation level (AL) of the UEs. That is, a BS may multiplex DCI signals (DCIs) to multiple UEs that the BS transmits to at a same aggregation level in one control channel, as in block 802 in FIG. 8. The BS may select a modulation and coding scheme (MCS) to use in transmitting the control channel, and transmit the control channel (as in block 804) using the selected MCS, along with an indication of the MCS and/or the size of the control channel.

Figure 10:
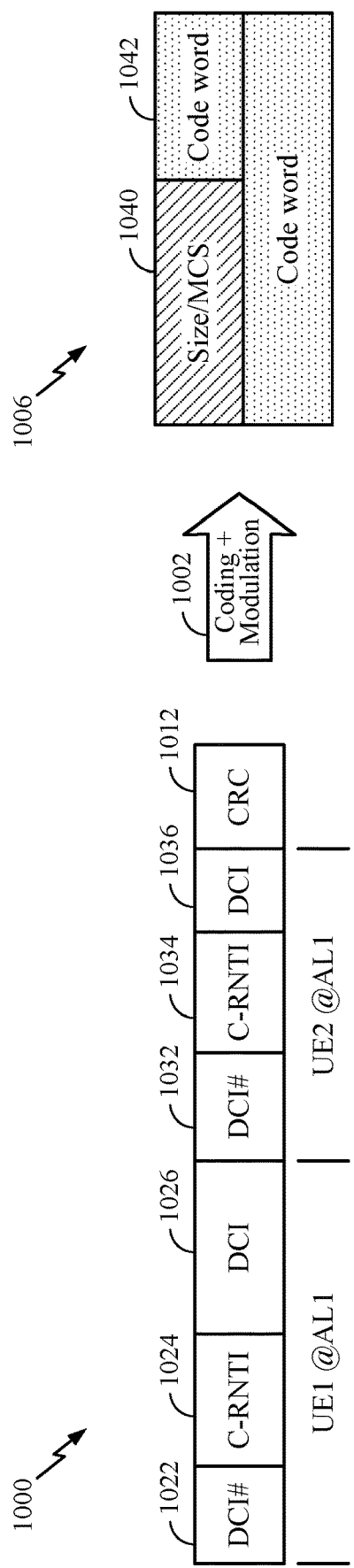
FIG. 10 is a block diagram illustrating exemplary multiplexing of DCI signals, in accordance with aspects of the present disclosure.

FIG. 10 is a block diagram illustrating exemplary multiplexing and transmission of DCI signals 1026 and 1036 in control channel 1000, according to aspects of the present disclosure. A BS may perform operation 800, shown in FIG. 8, in multiplexing the DCI signals and transmitting the control channels.

A BS may multiplex a first DCI signal 1026 directed to UE1 with a second DCI signal 1036 directed to UE2 in control channel 1000. In multiplexing together the DCI signals, the BS may also include DCI format or DCI #fields 1022, 1032 and UE identifier (e.g., a cell radio network temporary identifier (C-RNTI)) fields 1024, 1034. A UE receiving the control channel may use the DCI format fields to determine the length of each DCI and hence, the starting point for a next field (e.g., a DCI #field) in the control channel. A UE receiving the control channel may use the identifier fields to determine which, if any, of the DCI signals in the control channel are directed to the UE. The BS may multiplex DCI signals for UEs (e.g., UE1 and UE2) that are at a same aggregation level (e.g., AL1) when the BS transmits to the UEs. Note that "AL1" in FIG. 10 is representative of a first aggregation level, and may refer to ALs equal to 1, 2, 4, or 8. The BS may also compute a CRC for all of the fields (e.g., DCI format fields 1022 and 1032, UE identifier fields 1024 and 1034, DCI signals 1026 and 1036) and include the computed CRC in a CRC field 1012 in the control channel. A UE receiving the control channel may use the CRC field to verify that the UE has received the control channel correctly.

While the exemplary control channel 1000 shows the various fields concatenated together, other methods (e.g., interleaving) of combining the fields into a control channel are included in aspects of the disclosure. Similarly, while two DCI signals for two UEs are shown, other numbers of DCI signals for other numbers of UEs are also included in aspects of the disclosure. A BS may also aggregate multiple DCI signals for one UE in a control channel, according to aspects of the present disclosure.

The BS may then select a modulation and coding scheme (MCS) for transmitting the control channel to the UEs. The BS then performs coding and modulation, shown at 1002, on the control channel. Modulation and coding of the control channel results in one or more code words that may be transmitted. If the BS is not transmitting DCI signals to UEs at any other AL, then the BS may transmit an indication 1040 of the size and/or MCS with the one or more code words 1042 to the UEs (i.e., UE1 and UE2), as shown at 1006.

Figure 11:
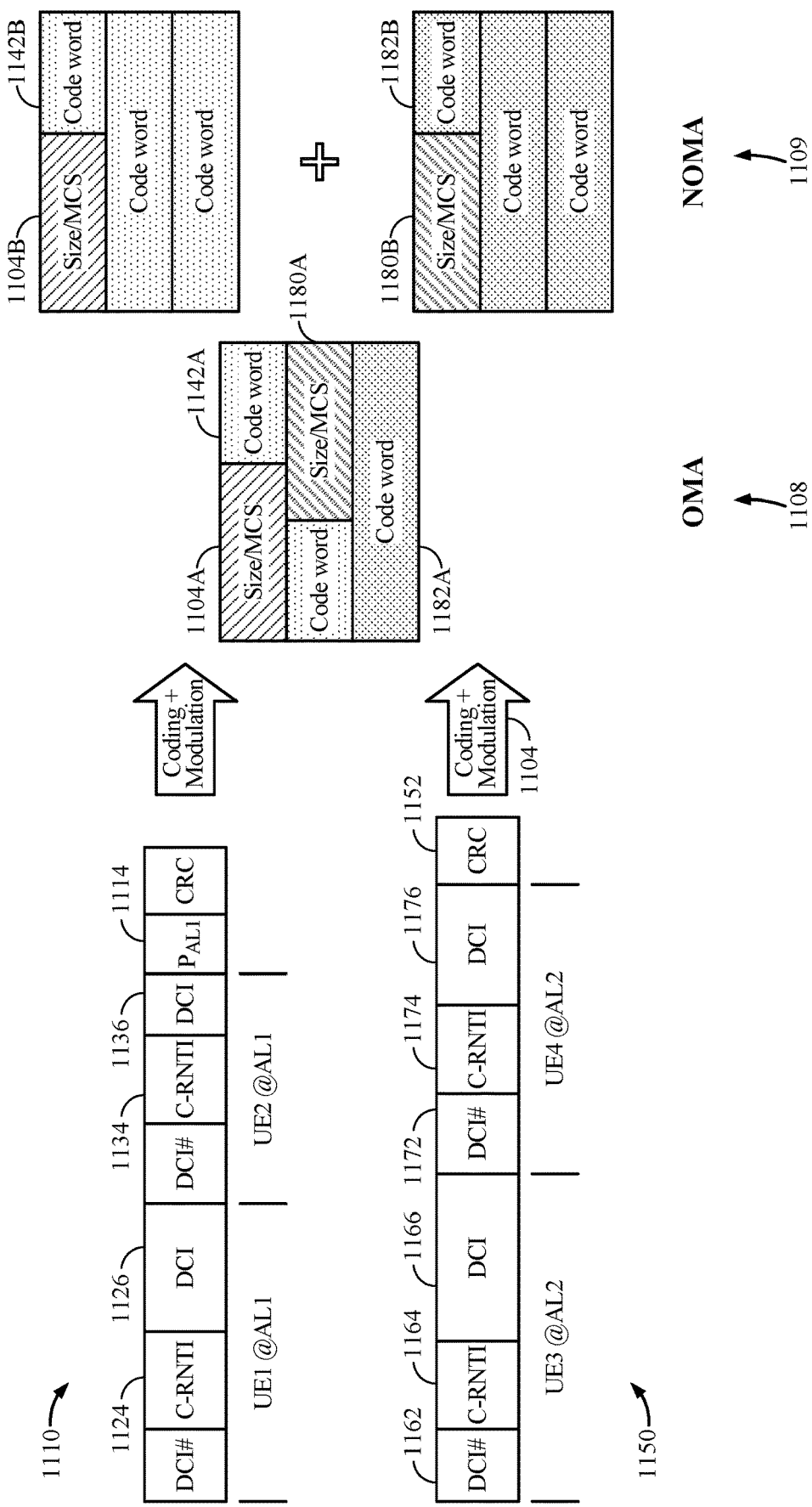
FIG. 11 is a block diagram illustrating exemplary multiplexing of DCI signals, in accordance with aspects of the present disclosure.

FIG. 11 is a block diagram illustrating exemplary multiplexing and transmission of DCI signals 1126, 1136, 1166, and 1176 in control channels 1110 and/or 1150, according to aspects of the present disclosure. A BS may perform operation 800, shown in FIG. 8, in multiplexing the DCI signals and transmitting the control channels.

Exemplary control channel 1110 may be similar to exemplary control channel 1000, shown in FIG. 10. If the BS is transmitting DCI signals to UEs at another AL, then the BS may also multiplex a third DCI signal 1166 directed to UE3 with a fourth DCI signal 1176 directed to UE4 in control channel 1150. As with control channel 1110, the BS may include DCI #fields 1162, 1172 and UE identifier fields 1164, 1174 in control channel 1150. Also as before, the BS may compute a CRC for the control channel 1150 and include the computed CRC in a CRC field 1152. And, as with control channel 1110, the BS aggregates UEs at a same aggregation level (e.g., AL2) in control channel 1150. Similar to "AL1," "AL2" is representative of a second AL, and may refer to ALs equal to 1, 2, 4, or 8. The BS may then perform a separate coding modulation operation, shown at 1104, on the control channel 1150.

The BS may then transmit the code word(s) 1142 for the first control channel 1110 with an indication 1140 of the size of the code words and/or the MCS used in transmitting the code words for the first control channel and the code word(s) 1182 for the second control channel 1150 with an indication 1180 of the size of the code words and/or the MCS used in transmitting the code words for the second control channel.

When transmitting the code words 1142, 1182 for the first and second control channels, the BS may transmit the code words using orthogonal multiple access (OMA), as at 1108, or non-orthogonal multiple access (NOMA), as at 1109. When transmitting the code words using OMA, the BS transmits each size and/or MCS indication 1140A, 1180A and code word 1142A, 1182A on a separate set of time and frequency resources. That is, each of the size/MCS indications and code words are transmitted on a set of CCEs that is not used for any other transmission by the BS. When transmitting the codewords using OMA, the BS transmits the second control channel at a starting CCE that may be determined based on the size/MCS indication 1140A of the first control channel.

When transmitting the code words using NOMA, as at 1109, the BS transmits the size/MCS indication 1140B and code words 1142B for one aggregation level combined with the size/MCS indication 1180B and code words 1182B for another aggregation level on one set of CCEs. The BS transmits the size/MCS indication 1140B and code words 1142B for the first control channel 1110 at a first power level and the size/MCS indication 1180B and code words 1182B for the second control channel at a second power level lower than the first power level. When transmitting using NOMA, the first control channel 1010 may contain DCIs directed to UEs at an AL (e.g., AL=8) that is higher than the AL (e.g., AL=4) of the UEs to which the DCIs in the second control channel 1050 are directed. The BS may also include an indication of the first power level (PALi) in a power level field 1114 in the first control channel.

A UE receiving control channels (e.g., control channels 1110, 1150) transmitted using NOMA may identify one or more DCIs (e.g., DCIs 1126, 1136, 1166, 1176) in a control channel directed to the UE. If the BS transmits DCIs for the UE (e.g., UE1, UE2) using the first aggregation level (e.g., AL1), then the UE may identify one or more DCIs (e.g., DCIs 1126, 1136) directed to the UE by determining an identifier of the UE is in one or more UE identifier fields (e.g., UE identifier fields 1124, 1134) in the first control channel. Because the BS transmits DCIs for the UE at the first aggregation level, which, as described above, is higher than the second aggregation level, the UE may be able to decode the first control channel (e.g., control channel 1110) while ignoring the second control channel (e.g., control channel 1150), which was transmitted at a lower power level.

If the BS transmits DCIs for a UE (e.g., UE3, UE4) using NOMA and the second aggregation level (e.g., AL2), then the UE may use successive interference cancellation (SIC) to detect the second control channel (e.g., control channel 1150) within the transmission. The UE may receive the transmission and determine the power level used to transmit the first control channel (e.g., control channel 1110) from a power level field (e.g., power level field 1114) in the first control channel. The UE may use the received first control channel and the indicated power level to cancel the first control channel from the received transmission to make a second received transmission. The UE may then detect the second control channel (e.g., control channel 1150) within the second received transmission. If the UE is successful in detecting the second control channel (e.g., the CRC 1152 for the second control channel matches a CRC computed by the UE for the second control channel), then the UE may identify DCIs (e.g., DCIs 1166, 1176) directed to the UE by determining an identifier of the UE is in one or more UE identifier fields (e.g., UE identifier fields 1164, 1174) in the second control channel.

While the above is described in terms of two control channels, the disclosure is not so limited. According to aspects of the present disclosure, a BS may transmit more than two (e.g., four) control channels, with each control channel directed to UEs at an aggregation level. When transmitting control channels using NOMA, the BS may transmit a power level field with each control channel except the control channel transmitted at the lowest power level.

According to aspects of the present disclosure, a BS (e.g., eNodeB 204A in FIG. 2) may send (e.g., via an X2 interface) an indication of an aggregation level (e.g., AL=8) that the BS is going to use in transmitting to served UEs during a time period (e.g., a subframe) to a second BS (e.g., eNodeB 204F in FIG. 2). The second BS may use the indication in determining aggregation levels of UEs that the second BS will transmit to during the time period. For example, a first BS may send to a second BS that the first BS is going to transmit to UEs using aggregation level 8 during a subframe. In the example, the second BS is a neighbor BS of the first BS. In the example, the second BS is able to determine that the first BS may be transmitting at a high power level to cell-edge UEs during the subframe, because aggregation level 8 is used for UEs in poor SINR conditions. Still in the example, the second BS may determine to transmit only to UEs at aggregation level 1, both to avoid interference from the first BS and to avoid interfering with transmissions by the first BS. BSs in an area may cooperate to exchange information on aggregation levels used in transmissions in this manner, which may be referred to as inter-cell interference coordination (ICIC).

FIG. 12 illustrates an exemplary set of fields 1200 that may be used when multiplexing DCIs in a control channel, according to aspects of the present disclosure described above. The MCS/size field 1202 may be four to seven bits in size, depending on the system bandwidth and aggregation levels being used by the transmitting BS. For example, if a BS is supporting a system bandwidth of 20 MHz, then the BS can transmit up to 100 CCEs in a subframe. In the example, if the BS is transmitting using aggregation level 1, then the BS would transmit the size of the control channel in seven bits, as the control channel could be from 1 to 100 CCEs long, depending on the number of DCIs being transmitted.

The DCI format or DCI #field 1204 may be four bits long, to allow up to sixteen different DCI formats. If it is determined (e.g., by a standards body) that more or fewer DCI formats should be supported, then the number of bits used for the DCI #field may be changed.

The C-RNTI field 1206 may be from four to sixteen bits long, depending on the number of active UEs a BS may be supporting. For example, a BS may support 2,000 or fewer active UEs. In the example, the BS may define the C-RNTI field to be twelve bits, allowing the BS to address up to 4,096 UEs while conserving four bits for other fields. The C-RNTI field may contain other types of identifiers for UEs, for example, a BS may transmit an SI-RNTI in the C-RNTI field for a DCI conveying a system information (SI) change.

The DCI field 1208 may be of variable length, depending on the information and/or commands being conveyed to the UE. The size of the DCI field may be determined from the format number conveyed in the DCI #field 1204.

The Power field 1210 may be from four to six bits long and conveys the power level used for transmitting the control channel when the control channel is transmitted with NOMA with at least one other control channel at a lower aggregation level (and power level). As described above, the power field is used by receiving UEs in performing success interference cancellation to detect control channels at lower aggregation levels.

The CRC field 1212 may be sixteen bits long. As described above, the CRC field is calculated by the transmitting BS based on the other fields of the control channel. Also as described above, a receiving UE verifies the CRC against the remainder of the control channel in order to ensure that the UE received the control channel correctly.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications by a base station (BS), comprising:
   multiplexing a first plurality of downlink control information (DCI) signals for a first plurality of user equipments (UEs) in control channel elements at a first aggregation level (AL) of a first control channel, wherein the first plurality of UEs are associated with a same AL; and
   transmitting the first control channel with the first plurality of DCI signals coded together in the control channel elements at the first AL.

2. The method of claim 1, further comprising:
   transmitting an indication of a modulation and coding scheme (MCS) and a size of the first control channel, wherein the first control channel is transmitted using the indicated MCS.

3. The method of claim 1, wherein multiplexing the first plurality of DCI signals for the first plurality of UEs at the first AL comprises concatenating the DCI signals prior to coding the DCI signals together in the first control channel.

4. The method of claim 1, further comprising:
   sending an indication of the first AL to another BS.

5. The method of claim 1, further comprising:
   selecting the first AL based on an indication from another BS that the other BS is not transmitting DCI signals at the first AL.

6. The method of claim 1, wherein each of the first plurality of DCI signals comprises a first fixed number of bits to indicate a format of the DCI signal and a second fixed number of bits to indicate a cell radio network temporary identifier (C-RNTI) of a corresponding UE.

7. The method of claim 1, further comprising:
   multiplexing a second plurality of downlink control information (DCI) signals for a second plurality of user equipments (UEs) at a second AL coded together in a second control channel.

8. The method of claim 7, further comprising:
   transmitting the second control channel, wherein transmitting the second control channel comprises transmitting the second control channel at a starting resource location indicated by a modulation and coding scheme (MCS) field or a size field of the first control channel.

9. The method of claim 7, wherein transmitting the first control channel comprises transmitting an indication of a first power level and the first plurality of DCI signals at the first power level, and the method further comprises:
   transmitting the second control channel, wherein transmitting the second control channel comprises transmitting the second plurality of DCI signals at a second power level while transmitting the first control channel.

10. A method for wireless communications by a user equipment (UE), comprising:
    receiving a first control channel including a plurality of downlink control information (DCI) signals for a plurality of UEs coded together in control channel elements at one aggregation level (AL), wherein the plurality of UEs are associated with a same AL; and
    identifying a DCI signal among the plurality of DCI signals within the first control channel directed to the UE.

11. The method of claim 10, further comprising:
    receiving an indication of a modulation and coding scheme (MCS) and a size of the first control channel, wherein the first control channel is transmitted using the indicated MCS and size; and
    decoding the DCI signal, based on the indicated MCS and size.

12. The method of claim 10, wherein the DCI signal comprises a fixed number of bits to indicate a format of the DCI signal, and the method further comprises:
    identifying a scheduling grant to the UE in the DCI signal, based on the indicated format.

13. The method of claim 10, wherein the DCI signal comprises a fixed number of bits to indicate a cell radio network temporary identifier (C-RNTI) of the UE, and the method further comprises:
    identifying a scheduling grant to the UE in the DCI signal, based on the indicated C-RNTI.

14. The method of claim 10, wherein the first control channel includes a first downlink control info information (DCI) signal at a first AL and an indication of a first power level, and the method further comprises:
    receiving a second control channel including a second DCI signal at a second AL; and
    using successive interference cancellation (SIC) based on the indication of the first power level to identify the second control channel.

15. The method of claim 10, wherein the first control channel includes a first downlink control info information (DCI) signal at a first AL and a first MCS and size field, and the method further comprises:
    receiving a second control channel including a second DCI signal at a second AL;
    determining a first starting resource location of the second control channel based on the first MCS and size field of the first control channel; and
    decoding the second control channel based on the determined first starting resource location.

16. An apparatus for wireless communications by a base station (B S), comprising:
    a memory; and
    one or more processors coupled to the memory and configured to:

multiplex a first plurality of downlink control information (DCI) signals for a first plurality of user equipments (UEs) in control channel elements at a first aggregation level (AL) of a first control channel, wherein the first plurality of UEs are associated with a same AL; and transmit the first control channel with the first plurality of DCI signals coded together in the control channel elements at the first AL.

17. The apparatus of claim 16, wherein the one or more processors are further configured to:
transmit an indication of a modulation and coding scheme (MCS) and a size of the first control channel; and
transmit the first control channel using the indicated MCS.

18. The apparatus of claim 16, wherein the one or more processors are further configured to multiplex the first plurality of DCI signals for the first plurality of UEs at the first AL by concatenating the DCI signals prior to coding the DCI signals together in the first control channel.

19. The apparatus of claim 16, wherein the one or more processors are further configured to:
send an indication of the first AL to another BS.

20. The apparatus of claim 16, wherein the one or more processors are further configured to:
select the first AL based on an indication from another BS that the other BS is not transmitting DCI signals at the first AL.

21. The apparatus of claim 16, wherein each of the first plurality of DCI signals comprises a first fixed number of bits to indicate a format of the DCI signal and a second fixed number of bits to indicate a cell radio network temporary identifier (C-RNTI) of a corresponding UE.

22. The apparatus of claim 16, wherein the one or more processors are further configured to:
multiplex a second plurality of downlink control information (DCI) signals for a second plurality of user equipments (UEs) at a second AL coded together in a second control channel.

23. The apparatus of claim 22, wherein the one or more processors are further configured to:
transmit the second control channel at a starting resource location indicated by a modulation and coding scheme (MCS) field or a size field of the first control channel.

24. The apparatus of claim 22, wherein transmitting the first control channel comprises transmitting an indication of a first power level and the first plurality of DCI signals at the first power level, and the one or more processors are further configured to:
transmit the second control channel, wherein transmitting the second control channel comprises transmitting the second plurality of DCI signals at a second power level while transmitting the first control channel.

25. An apparatus for wireless communications by a user equipment (UE), comprising:
a memory; and
one or more processors coupled to the memory and configured to:
receive a first control channel including a plurality of downlink control information (DCI) signals for a plurality of UEs coded together in control channel elements at one aggregation level (AL), wherein the plurality of UEs are associated with a same AL; and
identify a DCI signal among the plurality of DCI signals within the first control channel directed to the UE.

26. The apparatus of claim 25, wherein the one or more processors are further configured to:
receive an indication of a modulation and coding scheme (MCS) and a size of the first control channel, wherein the first control channel is transmitted using the indicated MCS and size; and
decode the DCI signal, based on the indicated MCS and size.

27. The apparatus of claim 25, wherein the DCI signal comprises a first fixed number of bits to indicate a format of the DCI signal and a second fixed number of bits to indicate a cell radio network temporary identifier (C-RNTI) of the UE, and the one or more processors are further configured to:
identify a scheduling grant to the UE in the DCI signal, based on the indicated format.

28. The apparatus of claim 25, wherein the first control channel includes a first downlink control info information (DCI) signal at a first AL and an indication of a first power level, and the one or more processors are further configured to:
receive a second control channel including a second DCI signal at a second AL; and
use successive interference cancellation (SIC) based on the indication of the first power level to identify the second control channel.

29. The apparatus of claim 25, wherein the first control channel includes a first downlink control info information (DCI) signal at a first AL and a first MCS and size field, and the processor one or more processors are configured to:
receive a second control channel including a second DCI signal at a second AL;
determine a first starting resource location of the second control channel based on the first MCS and size field of the first control channel; and
decode the second control channel based on the determined first starting resource location.

* * * * *